(No Model.)
G. C. McMICHAEL.
CAR COUPLING.
No. 453,127. Patented May 26, 1891.
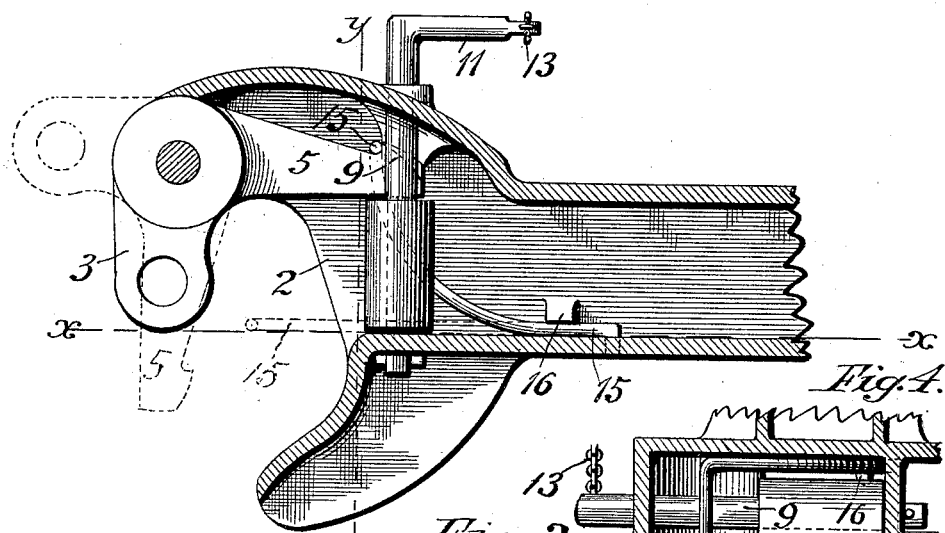
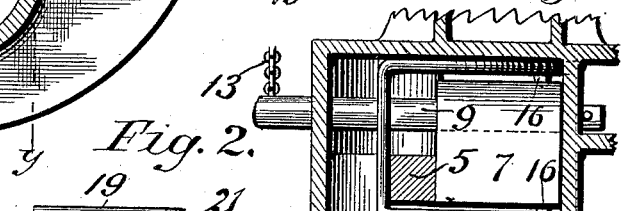
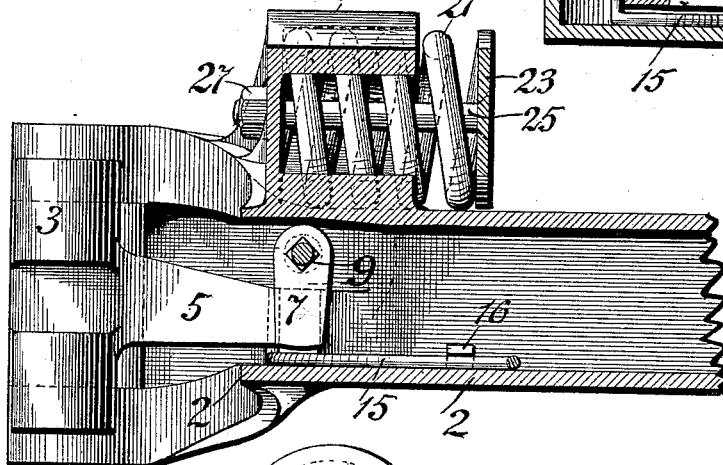
Witnesses
J. Jensen
C. E. Van Doren
Inventor:
George C. McMichael
By Paul & Morwin attys

UNITED STATES PATENT OFFICE.

GEORGE C. McMICHAEL, OF ST. PAUL, MINNESOTA.

CAR-COUPLING.

SPECIFICATION forming part of Letters Patent No. 453,127, dated May 26, 1891.

Application filed February 21, 1891. Serial No. 382,293. (No model.)

*To all whom it may concern:*

Be it known that I, GEORGE C. MCMICHAEL, of St. Paul, in the county of Ramsey and State of Minnesota, have invented certain Improvements in Car-Couplers, of which the following is a specification.

This invention relates to improvements in that class of car-couplers that is known as the "master-car-builder type;" and the objects of my invention are, first, to provide a coupler of this type in which the knuckle will open automatically whenever it is released from the locking device; second, to provide a coupler of this type with a suitable buffer that shall relieve the draft-springs and draft-rigging from the shock occasioned by the buffing strain; third, to provide an improved means for locking the knuckle in its closed position.

Other objects of the invention will appear from the following detailed description, taken in connection with the accompanying drawings, in which—

Figure 1 is a horizontal section of my improved coupler. Fig. 2 is longitudinal vertical section on line *x x* of Fig. 1. Fig. 3 is a transverse vertical section on line *y y* of Fig. 1. Fig. 4 is a detail transverse section showing a modified form of the spring.

In the drawings, 2 represents a portion of a draw-bar of the master-car-builder's type, and 3 is a swinging knuckle pivoted thereto in the usual manner. This knuckle is provided with the usual locking-finger 5. Any suitable means may be used for locking the finger when in its closed position. I prefer to provide a swinging or gravity dog 7, that is secured upon a shaft 9, that passes through the head of the draw-bar, preferably above the locking-finger of the knuckle. The shaft 9 is provided with a suitable crank-arm 11, and to this may be connected a suitable chain 13, that is connected with the ordinary unlocking-lever extending along the end of the car. The dog 7 occupies the space between the locking-finger and the inner wall of the draw-bar when the knuckle is in its closed position, thus forming a positive and dead lock for the knuckle and preventing any accidental uncoupling. As the knuckle is being closed the rear end of the finger, traveling in a substantially horizontal plane, strikes the lower portion of the dog 7, swinging the dog back and up, so as to permit the finger to pass. As soon as the finger passes the end of the dog the dog drops down by its own gravity into locking position.

I provide means by which the knuckle will be automatically opened whenever it is released, thus obviating the necessity of going between the cars and opening the knuckle by hand for the purpose of coupling with another coupler of this class when both knuckles are closed. For this purpose I provide a spring 15, that preferably extends into the shank of the draw-bar, and is secured therein, preferably upon or adjacent to the side wall or bottom of the shank. This spring extends into the head of the draw-bar, passing under the locking-dog, and engages the finger 5 of the knuckle. I prefer to carry the spring under the finger 5 and provide it with an upturned end that engages the rear side of the finger. If preferred, the spring may be of U form, as shown in Fig. 4, in which case it will extend above and below the locking-dog, and its legs will be secured one near the bottom of the draw-bar and one near the top. When the knuckle is open, this spring lies along the inner wall of the draw-bar in substantially the position indicated by the dotted lines in Fig. 1. As the knuckle is closed the finger 5 engages this spring 15, moving it into the position shown by full lines in Fig. 1, and thereby putting it under tension ready for action upon the releasing of the knuckle. I prefer to secure this spring in position by providing it with a rear end turned at an angle to the main part of the spring and passing into a hole or recess found in the side or bottom wall of the draw-bar and carrying the spring alongside a nib or projection 16 on the bottom wall of the draw-bar, thus securely fastening it in working position, or it may be secured to the side, bottom, or top of the draw-bar in any other suitable manner. I also prefer to provide this coupler with a spring-buffer that is attached to and becomes a part of the draw-bar. For this purpose I provide upon the top of the draw-bar a barrel 19, that may be formed upon or secured to the draw-bar. This barrel is provided with an open or rear end, into which an ordinary coiled spring 21 is inserted. The chafing-plate 23 is arranged against the rear end of this spring, and a bolt 25 passes through the chafing-plate, through the coiled spring, through the forward end of the barrel, and is provided upon its end with a nut 27, by means of which it is held in place. The chafing-plate 23, when the coupler is in position, rests against the dead-wood or end sill of the car, and thereby the buffing strain is distributed between this spring and the end sill, the draft-spring, and the draft-rigging.

I claim as my invention—

1. In a car-coupler, the combination, with the draw-bar and the swinging knuckle, of a spring arranged within the draw-bar with one end extending back into the shank of the draw-bar and the other end into the head of the bar and engaging said knuckle therein and adapted to throw the knuckle into its open position, substantially as described.

2. In a car-coupler, the combination, with the draw-bar and the swinging knuckle having the finger 5, of the locking-dog and the spring arranged within the draw-bar and engaging said finger, said spring extending under said dog, with its fixed end on one side of the dog and its moving end on the other side, substantially as described.

3. The combination, in a car-coupler provided with a swinging knuckle having a locking-finger 5, of the shaft extending through the head of the draw-bar above said finger and having its bearings in both walls of the draw-bar, with at least one end extending outside of the wall, whereby it is caused to serve both as the pivot for a gravity-dog and as the means for operating said dog, and the gravity-dog secured upon said shaft and adapted to lock said finger when the knuckle is closed, substantially as described.

4. The combination, in a car-coupler provided with a swinging knuckle having a locking-finger 5 and a locking device, of the spring arranged within the shank of the draw-bar and secured to its inner wall back of the locking device and projecting into the head of the draw-bar and engaging the finger of the knuckle for the purpose of automatically opening the knuckle when it is released, substantially as described.

5. In a car-coupler, the combination, with the draw-bar, of a barrel arranged upon the draw-bar, a spring arranged in said barrel, and a chafing-plate arranged against said spring and adapted to move therewith and bear upon the end sill or dead-wood of the car, substantially as described.

6. In a car-coupler, the combination, with the draw-bar, of a barrel arranged upon the draw-bar and provided with an open rear end, a spring arranged in said barrel, a chafing-plate secured against said spring and adapted to bear against the end sill or dead-wood of the car, and a bolt holding said plate and spring to said barrel, substantially as described.

In testimony whereof I have hereunto set my hand this 17th day of February, 1891.

GEO. C. McMICHAEL.

In presence of—
A. C. PAUL,
A. M. GASKILL.